Patented Jan. 10, 1939

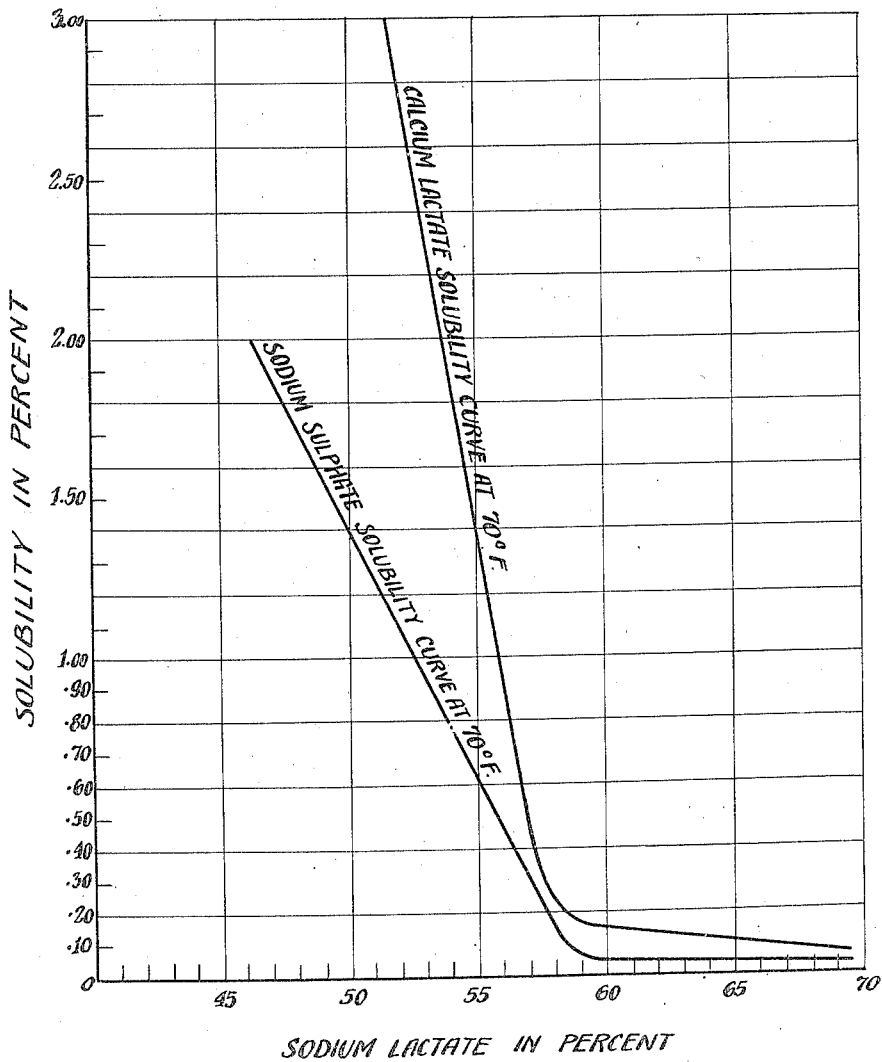

2,143,361

UNITED STATES PATENT OFFICE 2,143,361

METHOD OF MAKING A PURIFIED SODIUM LACTATE

Willard L. Morgan, Calumet City, Ill., and Abraham H. Goodman, Hammond, Ind., assignors to American Maize-Products Company, a corporation of Maine Application September 9, 1937, Serial No. 163,000

11 Claims. (Cl. 260—535)

Our invention relates to purified lactates such as sodium lactate and more particularly to a method of treating the normally impure lactates to eliminate the impurities therefrom and produce a pure stable product of desirable color and which will not become cloudy upon standing.

The purifying method of our invention is applicable generally to the treatment of lactates to remove undesirable components and produce stable products. The invention will be described, however, as applied to sodium lactate since it is especially responsive to our purifying treatment.

When sodium lactate is prepared by the usual procedure a highly colored yellowish red or brown product is produced, which upon standing will develop a hazy appearance with increase in color due to colloidal precipitation of some of its components. Also, there will occur frequently an extensive crystallization of salts from the solution. These undesirable effects are caused primarily by impurities remaining in the sodium lactate after it has been produced in accordance with the usual methods. While the type and amount of impurities present in the sodium lactate product will depend largely upon the raw materials and type of equipment used, it is not practical to produce a purified sodium lactate by the processes used heretofore. As suggested, the impurities remaining in the final product are formed during its manufacture in the usual manner.

An object of our invention is to produce a purified stable lactate such as sodium lactate.

Another object of our invention is to provide a process for treating normally impure sodium lactate to remove substantially all impurities and render the product stable against color formation and cloudying on exposure.

We have found that the sodium lactate prepared in accordance with the usual processes contains certain metal salts, particularly copper and iron salts, and calcium salts and that these salts give the product undesired color and render it unstable against colloidal precipitation and crystallization over a period of time. A feature of the process of our invention is to treat the impure sodium lactate to effect removal therefrom of these undesirable salts.

The process of our invention which will be described more in detail hereinafter comprises generally the following principles: The impure sodium lactate is first treated with sodium sulphide to precipitate the bulk of the copper and iron salts, maintaining the solution slightly alkaline to prevent formation of colloidal sulphur, and then filtering the solution to remove the precipitated sulphides. The solution is then treated with an oxidizing agent, for example hydrogen peroxide, to oxidize the excess sodium sulphide into sodium sulphate, which is subsequently removable by concentration and filtration. Next the solution is treated with activated carbon or similar material to effect removal of any excess hydrogen peroxide or other oxidizing agent used. Finally, the sodium lactate solution which is now in relatively pure form is concentrated sufficiently to crystallize out calcium lactate and sodium sulphate which are then removed by filtration; the resulting clear concentrated sodium lactate solution is then diluted to the desired strength for example, a 50% solution. By means of this purifying treatment all of the undesirable salts and contaminating materials present in the sodium lactate solution, which are not removed in the usual method of producing sodium lactate, are entirely eliminated and the resulting sodium lactate product is free of the usual undesirable yellowish red or brown color and will not precipitate or crystallize on standing. The application of the process of this invention may be understood more clearly by referring first to the usual process of manufacturing sodium lactate which removes some of the impurities present but does not effect removal of the metal salts and other materials that normally give the final product undesired characteristics. The usual procedure for preparing sodium lactate consists briefly of the following steps:

First, a carbohydrate material, preferably a sugar, is fermented with a suitable bacillus to produce lactic acid. The fermentation is carried out in the presence of a nutrient and an anti-acid such as calcium carbonate. The function of the anti-acid is to continuously adjust the acidity to the proper pH value during the fermentation cycle, in which lactic acid is first produced by the fermenting bacillus. This lactic acid reacts with the calcium carbonate to form calcium lactate. At the end of the fermentation, that is when practically all of the carbohydrates or sugar have been utilized by the bacillus, there remains a mixture of calcium lactate, a small amount of free lactic acid, excess unreacted calcium carbonate, and the non-utilized portion of the nutrient used.

In the next operation commonly referred to as the killing step, the active organisms, i. e., bacilli, are killed by heating and all of the lactic acid radicals are converted into their calcium salts, i. e., calcium lactate. This is accomplished by heating the fermented liquor at about 180° F. or higher with sufficient lime to give the mixture a pH of 10 to 12, usually a pH of 11. The resulting calcium lactate liquor is then separated by filtration from the insoluble matter present. The calcium lactate liquor at this stage has usually a dark, reddish brown color, which can be partly reduced by bleaching with a vegetable carbon. Either the bleached or unbleached liquor is then converted to sodium lactate by reacting the liquor with sodium carbonate forming the insoluble salt, calcium carbonate. The insoluble calcium carbonate is separated from the alkaline sodium lactate liquor by filtering and the pH of the filtered sodium lactate is then adjusted to the proper value by adding a suitable acid. The sodium lactate without further chemical treatment is concentrated to the desired concentration, usually 50% sodium lactate. Prior to the concentration step or after a partial concentration, bleaching of the sodium lactate solution with vegetable carbon is often used.

In the above described method of producing sodium lactate, it is to be noted that a killing step follows the fermentation operation and that in this step lime was added in sufficient amount to raise the pH of the solution to 10 to 12, usually 11. At that pH, a portion of the metals present in the calcium lactate liquor are precipitated and separated as metal hydroxides. However, in the presence of hydroxy organic compounds such as lactic acid, calcium lactate, or sodium lactate, the precipitation of the metal hydroxides, e. g. copper hydroxide and iron hydroxide is not a quantitative operation. Considerable amounts of the metals remain in solution with the treated liquors. The metal salts that are left in the calcium lactate liquor at this stage and which impart color and other undesired properties, remain through the process and are found in the usual finished product. The effective removal of these undesirable salts in the killing operation as well as particularly calcium removal during the treatment with sodium carbonate is largely dependent upon the concentration of the calcium lactate liquor as explained below. The concentration of the calcium lactate at the killing step varies from 12 to 15 percent, meaning that there is present 85% or more water in the solution. The amount of metal or calcium salts left in solution at this point would be the equilibrium concentration of metal or calcium salts in a comparatively large amount of water. The concentration of sodium lactate in the finished solution is about 50% or higher. To produce a 100 pound quantity of 50% sodium lactate solution would require 325 pounds of 15% calcium lactate liquor. The amount of water present in the latter is equal to 227.7 pounds. This amount is decreased approximately 4.55 times by the concentration step, to 50 pounds of water in the 100 pounds of finished 50% sodium lactate.

The increase in concentration of the soluble metal salts is proportional to the decrease in the amount of water present. In the above case this increase would be equal to approximately 4.55 times the original concentration in the calcium lactate liquor. Consequently, if the concentration of metal salts is at all appreciable in the original liquors, and it usually is, the concentrated final 50 percent sodium lactate product will contain a supersaturated solution of the calcium, copper and iron salts. On storage these salts in the presence of sodium lactate are slowly reduced to their lower valent forms, i. e. cuprous and ferrous salts, which are very insoluble. The formation of these lower valent salts brings about a colloidal haze or precipitate and gives the sodium lactate a decided musty or hazy appearance, although the initial product may have been quite clear. These metal salts are also objectionable in that they impart intense color to the sodium lactate. For example, iron (ferric) lactate, which may be found, has an intense yellow color.

One of the first and important steps in the process of our invention consists in quantitatively removing these undesirable metal salts from the sodium lactate solution. This is done by treating the 50% sodium lactate solution, after it leaves the evaporator, with sodium sulphide, which precipitates all the copper present and most of the iron. The sodium sulphide is added in slight excess at a pH of 8 to 10 and is added all at once. It is advantageous that the sodium sulphide be present in slight excess to insure a more complete removal of metals. An alkaline pH is advantageous since colloidal sulphur would be formed if free acid were present. Also, it is important that all of the sodium sulphide be added at one time. If the sodium sulphide is added in several steps the precipitated metal sulphides are formed in such a finely divided state that is almost impossible to separate them from the sodium lactate solution. However, by adding it all at one time and to an excess, the total precipitate will flocculate sufficiently to be filterable. Preferably the liquors are also hot during this treatment being about 180° F. to facilitate the flocculation and subsequent removal by filtration of the precipitated sulphides.

The sodium lactate liquor at this point has been freed of metals and is distinctly of a light color but contains a slight excess of sodium sulphide. The presence of free sulphide is objectionable for two reasons. The first is that on standing, colloidal sulphur will be produced if the sodium lactate is made acid. Secondly, sodium lactate is used in the textile industry as a softening agent during color printing and the presence of free sulphide would change the shade of the dye used. Further, the odor arising from the sulphide is objectionable.

The free sulphide is removed by oxidation of the sodium sulphide to sodium sulphate with preferably hydrogen peroxide, or with other oxidizing agents such as hypochlorites. An excess of the oxidizing agent is desirable for quantitatively oxidizing the sodium sulphide to sodium sulphate. When hydrogen peroxide is used as the oxidizing agent it serves the additional purpose of reducing the color of the sodium lactate liquor by a bleaching action at the same time it is oxidizing the sodium sulphide.

The presence of the unused or excess hydrogen peroxide is objectionable for the same reason as was excess sodium sulphide, in that hydrogen peroxide also affects the shades of dyes in color printing. The excess of hydrogen peroxide is removed by treating the liquors with activated carbon which catalytically destroys the excess hydrogen peroxide. Besides removing the last traces of peroxide the carbon further bleaches the sodium lactate liquor, giving a lighter, purer product.

In the above described steps the excess sodium sulphide was oxidized to sodium sulphate and that salt remains in the sodium lactate solution. This normally causes no difficulties unless concentrated solutions of over 50% sodium lactate are desired. In concentrated sodium lactate solutions the solubility of sodium sulphate and also calcium lactate, the formation of which is explained below, decreases very rapidly between 50% and 60% concentrations of sodium lactate and at concentrations of 60% to 70% the solubility becomes extremely small. This will be easily recognized by referring to the curve in the accompanying drawing. As shown on this curve, the solubility of the sodium sulphate in sodium lactate solution decreases from about 1.4% at a 50% sodium lactate concentration, to about 0.05% at a 60% sodium lactate concentration. For the same change in sodium lactate concentration the solubility of calcium lactate decreases from over 3% to about 0.15%. Thus in solutions of sodium lactate of over 50% concentration and especially over 60% concentration, the sodium sulphate and calcium lactate would tend to crystallize and separate out of the solution and give the sodium lactate undesired properties.

The above discussed calcium lactate is present because of the incomplete reaction of the fermented calcium lactate liquors with the sodium carbonate as described hereinabove. This remaining calcium lactate is particularly objectionable in that it gives a double salt with sodium lactate that crystallizes out in a very bulky form. The sodium sulphate which is formed in the removal of the metal impurities as described above, will also usually cause a precipitation in sodium lactate of concentrations of 55% or above. The time required for these salts to crystallize out varies with the purity of the sodium lactate. The purer the sodium lactate the easier and quicker is the crystallization. The presence of caramel coloring, dextrins or other free carbohydrate impurities tends to retard the crystallization and seems to hold a higher supersaturation of calcium lactate and sodium sulphate in solution. By our additional carbon treatments we decrease by adsorption the amounts of these bodies which retard these crystallizations and thus our purer sodium lactate solutions if concentrated develop crystals in contrast to the more impure prior known solutions.

We have found that in our initial purified sodium lactate product the sodium sulphate and calcium lactate are so near saturation or supersaturation that when the product is further purified and concentrated to above 50 to 55 percent sodium lactate, the sodium sulphate and calcium lactate crystallize on standing. These salts may therefore be removed from the purified sodium lactate by over-concentrating the sodium lactate solution, for example, to 60 to 75 percent sodium lactate, to cause the salts to crystallize and then filtering off the salts leaving a clear liquor. This solution is then diluted back to a 50% sodium lactate strength. In this manner a purified sodium lactate is produced that will hold up indefinitely as a clear product on exposure inasmuch as the 50% sodium lactate is then not saturated with the sodium sulphate and calcium lactate salts.

In accordance with the illustrative but non-limiting embodiment of our invention, the desired purified sodium lactate product may be obtained as follows:

Approximately 2500 gallons of 12 to 15% sodium lactate produced from dextrose by the processes described hereinabove are treated with 50 pounds of sodium sulfide, of which 5 pounds is in excess of that required to precipitate the metals present. The excess sodium sulphide is then oxidized by hydrogen peroxide. To oxidize and remove the 5 pounds excess sodium sulfide requires 9 pounds of 100% hydrogen peroxide or 30 pounds of 30% hydrogen peroxide. Actually, we have found the use of 45 to 100 pounds of 30% hydrogen peroxide to be desirable inasmuch as the excess peroxide bleaches the color of the sodium lactate solution. The treated liquor is then further bleached and the excess peroxide removed by adding 100 pounds of vegetable carbon and filtering. The resulting light-colored liquor is then concentrated to 65% sodium lactate in a vacuum evaporator, at which concentration the sodium sulphate and calcium lactate salts are precipitated and filtered out. The remaining clear concentrated sodium lactate solution is then diluted to 50% sodium lactate.

It will be understood that the foregoing description of our process is given only by way of example, and that various changes and modifications may be made without departing from the scope of our invention. The process may be applied to other lactates than sodium lactate. For example, we may purify in a similar manner, potassium, ammonium, or amine lactates. Likewise, the sodium sulphide, hydrogen peroxide, and activated carbon used for purposes above described may be substituted by various other materials having an equivalent function. As an example, we may use other water soluble sulphides such as barium sulphide the excess of which is removed as insoluble barium sulphate after treatment with peroxide. It will be understood that when lactates other than sodium lactate are to be purified the sodium sulphide will be substituted whenever necessary by a precipitating agent compatible with the product uses and lactate being purified. Some of the novel features of this invention are defined in the appended claims.

We claim:

1. A process of making a purified stable sodium lactate comprising treating impure sodium lactate with sodium sulphide to effect precipitation of the foreign metal salts, removing the precipitated salts, oxidizing the excess sodium sulphide into sodium sulphate, such oxidizing being effected with a soluble oxidizing agent capable of being catalytically dissociated by carbon, removing excess oxidizing agent by treatment with carbon, concentrating the resulting sodium lactate containing said sodium sulphate in solution, to cause said sodium sulphate to crystallize, and removing said crystallized sodium sulphate.

2. A process of making a purified stable sodium lactate comprising treating impure sodium lactate with sodium sulphide to precipitate the copper and iron salts, filtering the solution to remove said salts, oxidizing the excess sodium sulphide with hydrogen peroxide to form sodium sulphate, removing any excess of the hydrogen peroxide, concentrating the resulting sodium lactate solution to cause said sodium sulphate to precipitate and removing said sodium sulphate.

3. A process of making a purified stable sodium lactate comprising treating the usual impure sodium lactate with sodium sulphide to precipitate the foreign metal salts including copper and iron, filtering to remove the precipitated salts, oxidizing the excess sodium sulphide into sodium sulphate with hydrogen peroxide, treating the filtered solution with activated carbon to remove any excess of the hydrogen peroxide, concentrating the resulting sodium lactate solution sufficiently to crystallize said sodium sulphate and other undesired salts, filtering to remove the crystallized salts, and diluting the resulting concentrated sodium lactate.

4. A process of preparing a purified stable sodium lactate comprising treating impure sodium lactate, containing copper and iron salts, with an alkaline sulphide solution to precipitate said salts, said sulphide solution being present in excess amount to prohibit formation of colloidal metal sulphides, oxidizing the excess sulphide into sulphate with an excess of soluble oxidizing agent capable of being absorbed by carbon, treating the remaining solution with vegetable carbon to remove the excess of the oxidizing agent, concentrating the resulting sodium lactate solution to effect crystallization of said sulphate and of any calcium lactate salts present therein, filtering to remove said crystallized salts and diluting the resulting purified sodium lactate to the desired concentration.

5. A process of making a purified stable sodium lactate comprising treating impure sodium lactate with a water soluble sulphide to precipitate the foreign metal salts, removing the precipitated salts, oxidizing the excess sulphide into sulphate with an oxidizing agent selected from the group consisting of hydrogen peroxide and hypochlorites, removing any excess of the oxidizing agent with carbon, and concentrating the resulting sodium lactate solution to precipitate said sulphate and other undesired salts and removing said salts.

6. A process of preparing a purified stable lactate of the class consisting of sodium, potassium, ammonium and amine lactates, comprising treating the impure lactate with a suitable water soluble sulphide to precipitate the foreign metal salts, removing the precipitated salts, treating the remaining lactate solution with a soluble oxidizing agent which is non-toxic and is capable of being absorbed by vegetable carbon to convert the excess sulphide into sulphate, treating the lactate solution containing said sulphate with an absorbing material to remove any excess of the oxidizing agent, concentrating the resulting lactate solution to precipitate said sulphate and other crystallizable salts and removing said salts.

7. In the process of preparing purified stable sodium lactate from the usual impure sodium lactate, the steps of treating said impure sodium lactate with sodium sulphide to precipitate the undesired metal salts present therein so that said salts may be removed, the sodium sulphide being used in excess to effect quantitative precipitation of said salts and being alkaline to prevent formation of colloidal sulphur and oxidizing the excess sodium sulphide into sodium sulphate which can be removed subsequently by concentration and filtration.

8. In the process of preparing purified, stable sodium lactate from partially purified sodium lactate substantially free of heavy metal salts but containing sodium sulphate and calcium lactate, the step of concentrating the sodium lactate solution to at least about 60% sodium lactate to precipitate said sodium sulphate and calcium lactate so that they may be removed from said sodium lactate solution.

9. In a process of preparing a purified stable sodium lactate by treating impure sodium lactate the improvement which comprises treating the impure sodium lactate with excess of water soluble sulphide to precipitate foreign metal salts which can be removed by filtration and oxidizing said excess sulphide into sulphate with a soluble oxidizing agent capable of being catalytically dissociated by carbon.

10. A process of making a purified stable sodium lactate comprising treating impure sodium lactate with a water soluble sulphide to precipitate foreign metal salts filtering the solution to remove said salts oxidizing the excess sulphide with an oxidizing agent selected from the group consisting of hydrogen peroxide and hypochlorites and removing any excess of said oxidizing agent by treatment with carbon.

11. A process as defined in claim 4, in which the treatment with alkaline sulphide is carried out at a pH of about 8 to 10.

WILLARD L. MORGAN.
ABRAHAM H. GOODMAN.